No. 732,019. PATENTED JUNE 23, 1903.
A. WOLF.
GYRATING SIEVE OR BOLTING MACHINE.
APPLICATION FILED NOV. 20, 1899.
NO MODEL. 5 SHEETS—SHEET 1.
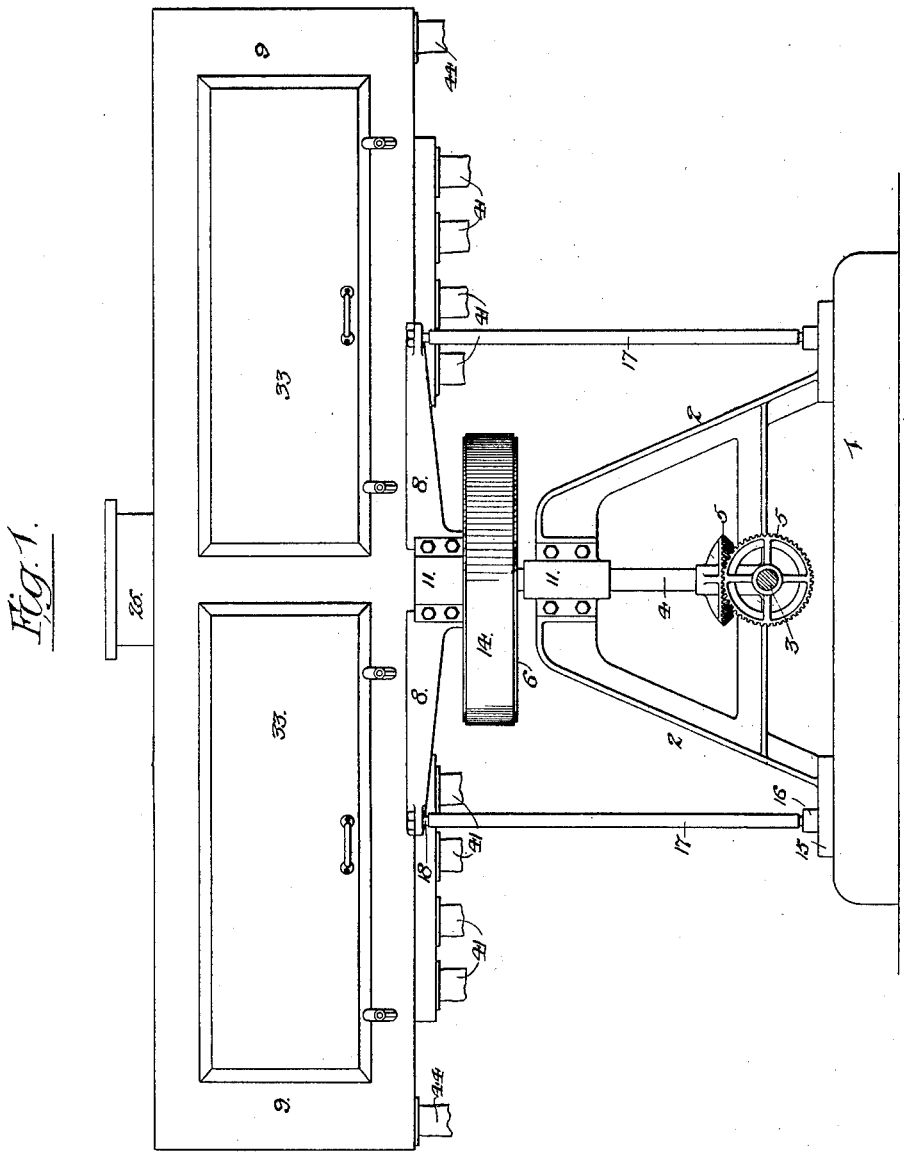
Witnesses:-
Frank L. A. Graham.
Louis M. T. Whitehead
Inventor:-
Augustus Wolf.
by his Attorneys:-
Howson & Howson No. 732,019. PATENTED JUNE 23, 1903.
A. WOLF.
GYRATING SIEVE OR BOLTING MACHINE.
APPLICATION FILED NOV. 20, 1899.
NO MODEL. 5 SHEETS—SHEET 2.
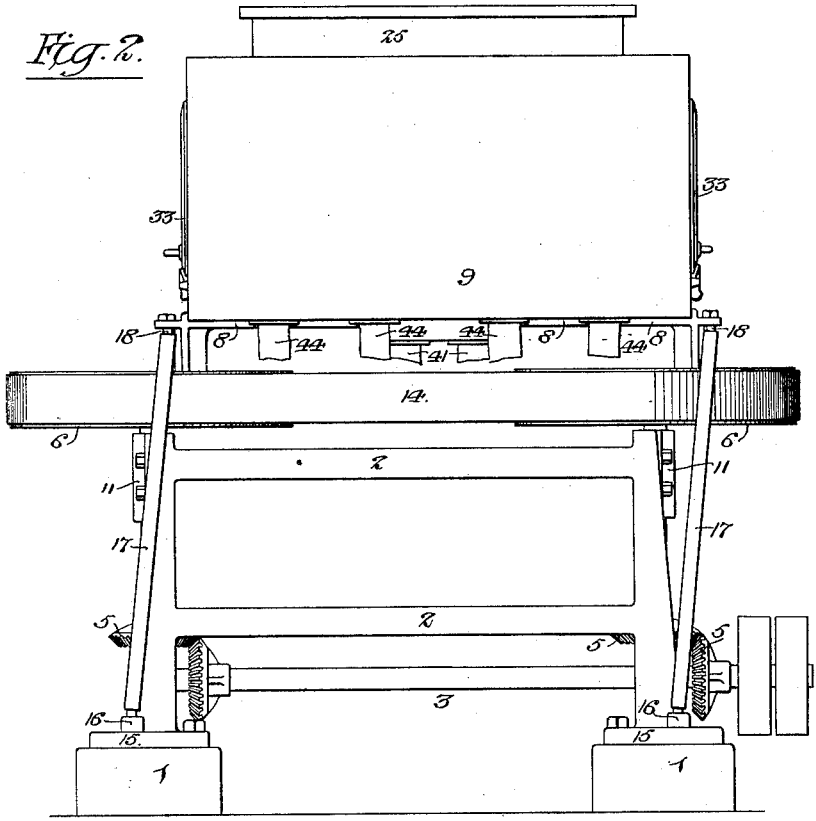
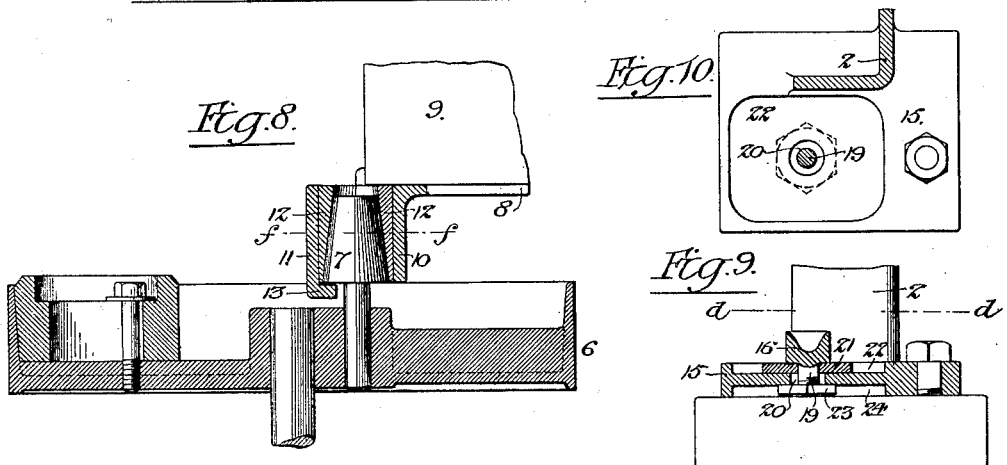
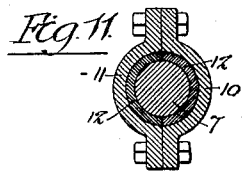
Witnesses:—
Frank F. A. Graham.
Louis W. F. Whitehead.
Inventor:—
Augustus Wolf,
by his Attorneys:
Howson & Howson No. 732,019. PATENTED JUNE 23, 1903.
A. WOLF.
GYRATING SIEVE OR BOLTING MACHINE.
APPLICATION FILED NOV. 20, 1899.
NO MODEL. 5 SHEETS—SHEET 3.
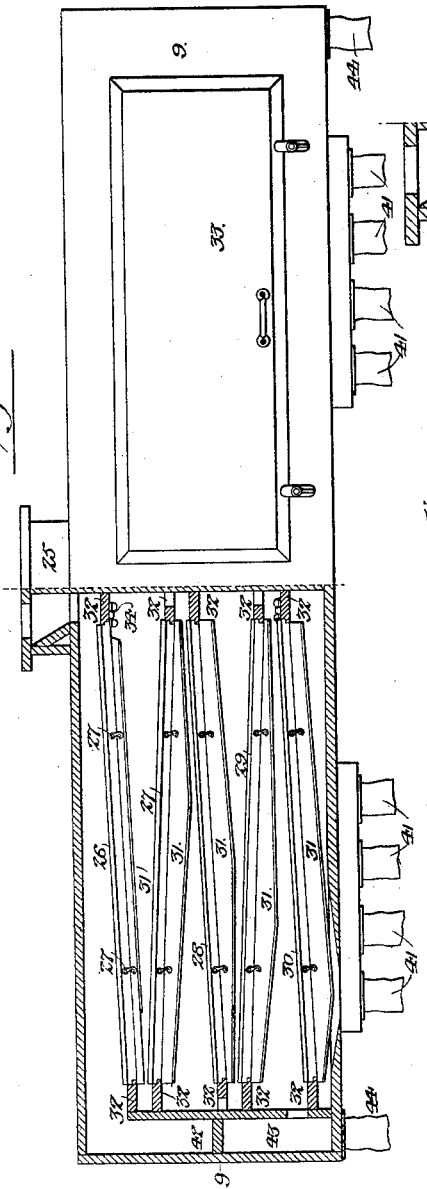
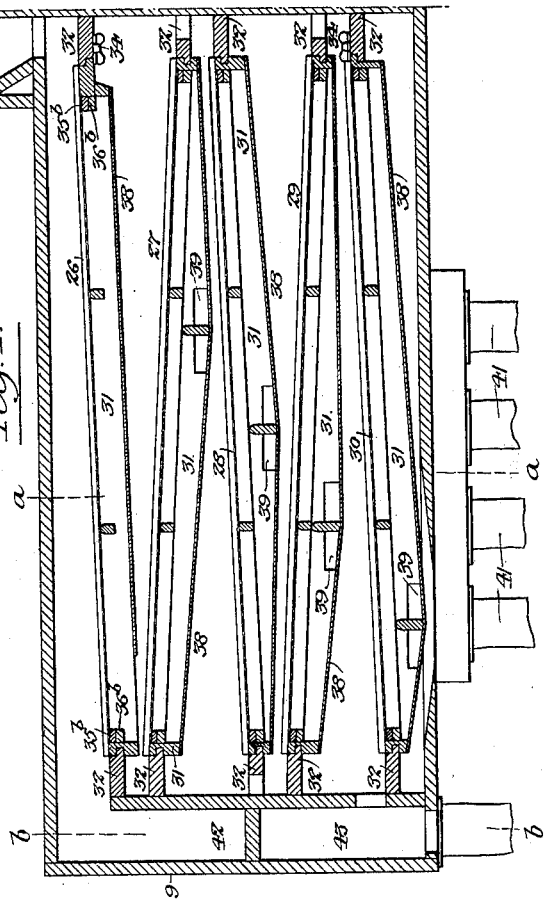
Witnesses:—
Frank L. A. Graham
Louis M. L. Whitehead.
Inventor:—
Augustus Wolf.
by his Attorneys
Howson & Howson No. 732,019. PATENTED JUNE 23, 1903.
A. WOLF.
GYRATING SIEVE OR BOLTING MACHINE.
APPLICATION FILED NOV. 20, 1899.
NO MODEL. 5 SHEETS—SHEET 4.

Witnesses:
Frank L. A. Graham
Louis M. F. Whitehead

Inventor:
Augustus Wolf
by his Attorneys

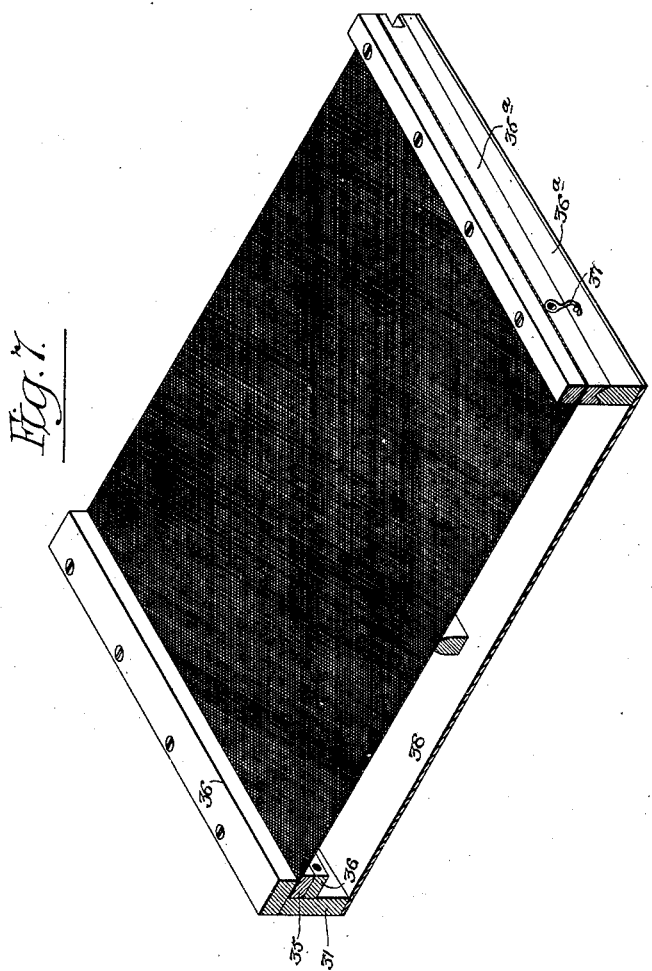

No. 732,019. Patented June 23, 1903.

UNITED STATES PATENT OFFICE.

AUGUSTUS WOLF, OF CHAMBERSBURG, PENNSYLVANIA, ASSIGNOR TO THE WOLF COMPANY, OF CHAMBERSBURG, PENNSYLVANIA, A CORPORATION OF PENNSYLVANIA.

GYRATING SIEVE OR BOLTING-MACHINE.

SPECIFICATION forming part of Letters Patent No. 732,019, dated June 23, 1903.

Application filed November 20, 1899. Serial No. 737,668. (No model.)

*To all whom it may concern:*

Be it known that I, AUGUSTUS WOLF, a citizen of the United States, and a resident of Chambersburg, Pennsylvania, have invented certain Improvements in Gyrating Sieves or Bolting-Machines, of which the following is a specification.

My invention relates to that class of bolting-machines in which the sieves or screens are carried by a box or casing mounted so as to gyrate or travel in a circular path in a horizontal plane, the object of my present improvements being to provide for ready access to the sieves or screens and to permit ready insertion or withdrawal of the same, to separate to any desired extent the material delivered by the screens, to provide for adjustment of the sieve-box-supporting devices so as to preserve at all times the desired accurate relation to each other of said supporting devices, and to provide for automatically taking up the wear of the bearings for the crank pins or studs, whereby movement is imparted to the sieve-box. These objects I attain in the manner hereinafter set forth, reference being had to the accompanying drawings, in which—

Figure 5:
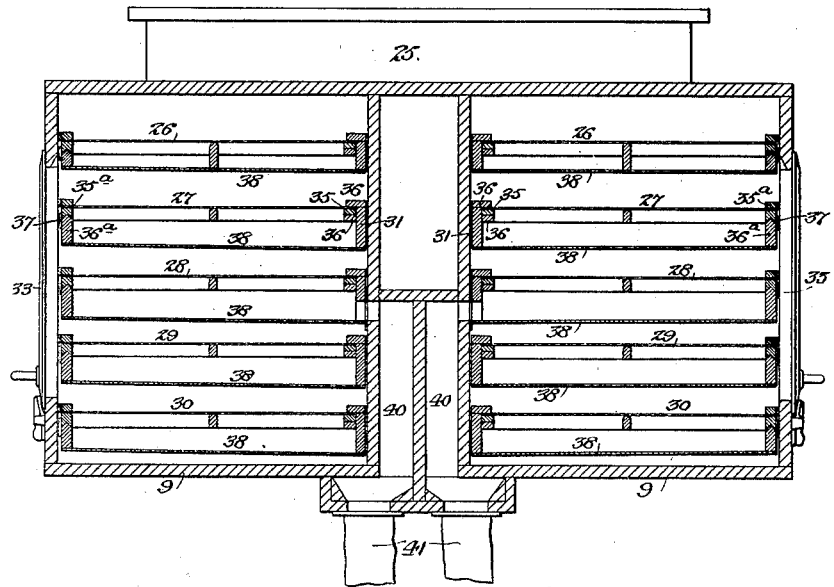
Figure 6:
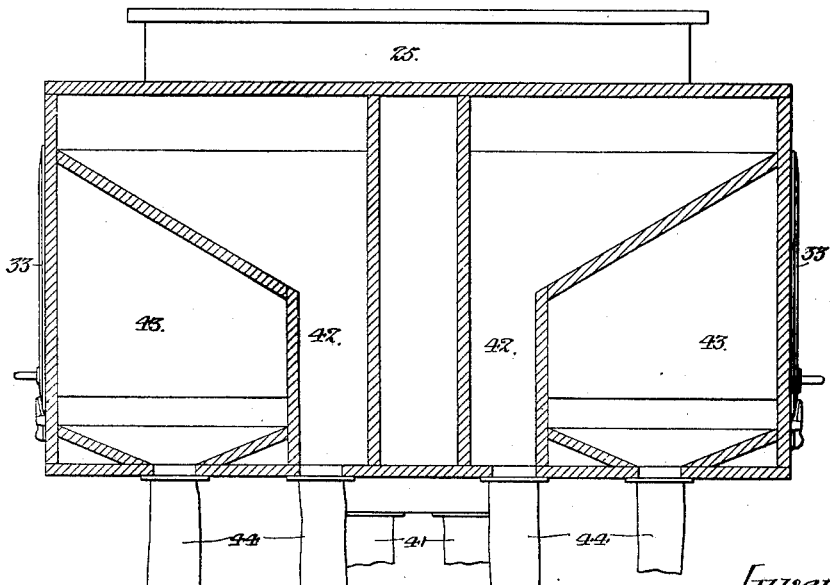

Figure 1 is a side elevation of a gyrating sieve or bolting-machine constructed in accordance with my invention. Fig. 2 is an end elevation of the same. Fig. 3 is a view of the sieve-box partly in elevation and partly in longitudinal section. Fig. 4 is a longitudinal section, on an enlarged scale, of part of the sieve-box and its sieve structures. Fig. 5 is a transverse section on the line $a\,a$, Fig. 4. Fig. 6 is a transverse section on the line $b\,b$, Fig. 4. Fig. 7 is a sectional perspective view of one of said sieve structures. Fig. 8 is an enlarged sectional view of one of the driving-disks of the machine with its crank-pin and of the sieve-box bearing for the reception of the latter. Fig. 9 is an enlarged sectional view of one of the adjustable sockets for the supporting-rods of the machine. Fig. 10 is a sectional plan view of the same on the line $d\,d$, Fig. 9; and Fig. 11 is a sectional plan view on the line $f\!f$, Fig. 8.

The base or foundation beams 1 support a frame 2, in which are bearings for a longitudinal shaft 3 and a pair of upright shafts 4, said longitudinal shaft having power applied to it in any available manner and being geared to each of the upright shafts by means of bevel-wheels 5. Each of the upright shafts carries a wheel or disk 6, which has a crank-pin 7, and on the frames 8, which carry the sieve-box structure 9, are boxes 10, with detachable caps 11, said boxes containing two-part antifriction-bushings 12, which engage with the crank-pin 7, the latter being tapered, as shown in Fig. 8, so as to be self-adjusting to the bushings as the latter wear, and the cap 11 of the bearing having a flange 13, which projects under the crank-pin and serves to prevent the lifting or forcing of the box 9 upwardly to such an extent as to relieve it from the control of the crank-pins. The pulleys or disks 6 are connected by a belt 14, as and for the purpose described in my former patent, No. 595,985, dated December 21, 1897.

The frame 2 has projecting feet 15 mounted upon and secured to the base-beams 1, and on each of these feet 15 is adjustably mounted a socket 16 for the reception of the lower end of one of the rods 17, whereby the sieve-box 9 is supported, each socket 16 having a flaring recess therein, as shown in Fig. 9, so that the rods 17 are free to swing in all directions in the sockets. The upper ends of the rods 17 have like recesses for the reception of pins 18 on the frames 8 of the sieve-box.

In order to insure the proper operation of a gyrating sieve or bolting-machine of the character described, it is necessary that the different supporting-rods 17 should bear exact relation to each other, and the purpose of the adjustability of the sockets 16 is to provide for the maintenance of this exact relation at all times. In the present instance each socket has a threaded stem 19, which passes through an opening 20 of considerably larger size than the stem formed in the foot 15 of the frame 2, the socket bearing upon a washer 21, which covers the top of the opening 20 and is free to move in a recess 22 in the top of the foot 15, while the threaded stem of the socket receives a nut 23, which bears upon the under side of the foot and is free to move in a recess 24 therein. (See Figs. 9 and 10.) It is manifest, however, that the washer 21 can be dispensed with, if desired.

Each of the sieve-boxes contains four systems of sieves, one system being in each of the four sections into which the sieve-box is divided by central, longitudinal, and transverse partitions, each system of sieves receiving its supply of material to be treated from its appropriate section of the centrally-located top feed-hopper 25 and discharging its tailings through passages at the ends of the box, while the material passing through the sieves of each system is discharged laterally into chambers or passages formed in the hollow longitudinal partition at the center of the box, this arrangement, generally considered, being similar to that of my former patent. In the present case, however, I provide for an independent discharge of screened material from different sieves of each system, and I have also modified and improved the means employed for gaining access to and inserting or withdrawing the sieves and sieve-holders.

As shown in the drawings, each sieve system comprises five sieves 26, 27, 28, 29, and 30, each sieve being carried by a holder 31, having end bars which are grooved or rabbeted for adaptation to supporting-bars 32, suitably secured at the proper heights within the fixed structure of the sieve-box, as shown in Fig. 4. Each section of the sieve-box has in its outer side an opening exceeding in length the length of each sieve, this opening being closed by a removable door or cover 33, and the intermediate sieves 27, 28, and 29 can when this cover 33 is removed be directly withdrawn laterally after the manner of drawers through said opening in the sieve-box. The holders of the upper and lower sieves 26 and 30, however, are held in engagement with the bars 32 at one end of said holders by means of turn-buttons 34, and when it is desired to remove these sieves the turn-buttons are manipulated so as to release the end of the sieve-holder, which is then raised above or dropped below the supporting-bar to such an extent that the holder can be moved longitudinally to withdraw its opposite end from engagement with the opposite supporting-bar, whereupon it is free to be moved into such position that it can be withdrawn laterally through the opening in the sieve-box. Each sieve is also readily detachable from its holder 31, the inner side bar of the sieve-frame forming a tenon 35, which fits into a mortise formed by bars 36 at the inner side of the holder 31, while the outer side bar 35$^a$ of said sieve-frame rests upon the outer side bar 36$^a$ of the holder and is confined thereto by hooks 37 or other equivalent fastenings, said outer bar of the sieve-frame being grooved in its under face and the top of the outer bar 36$^a$ of the holder being V-shaped or ribbed for adaptation to said groove, as shown in Figs. 5 and 7, so as to prevent any lateral displacement of the sieve on the holder.

The end bars 35$^b$ of the sieve-frames rest upon end bars 36$^b$ of the holders, as shown in Fig. 4. The frame of each sieve-holder carries a collecting-plate 38, which receives and directs to a point of discharge the material passing through the sieve. The material from the collecting-plate of the top sieve 26 discharges onto the head of the next lower sieve 27; but the material from the collecting-plates 38 of the sieves 27, 28, 29, and 30 is discharged laterally through an opening 39 into passages 40 in the hollow central longitudinal partition of the sieve-box, the discharge-passage of each sieve being independent of the others, and each passage having its flexible delivery-spout 41, so that the different grades of material can be kept separate or combined in any manner desired. The tailings from the upper sieve of each system are discharged into a passage 42 at the end of the sieve-box, and the tailings from the lower sieve of each system discharge into a chamber 43 at said end of the sieve-box, each tailings passage or chamber having its own flexible delivery-pipe 44, as shown in Fig. 6. The tailings from the sieves 27, 28, and 29 discharge, respectively, onto the next lower sieve of the system.

Having thus described my invention, I claim and desire to secure by Letters Patent—

1. The combination of a sieve-frame, a sieve-holder, the latter having at one side a bar for supporting one side member of the sieve-frame, and also having means for retaining said member in position, together with a ribbed bar on the opposite side of the sieve-holder, one of the members of the sieve-frame being grooved and constructed to engage the ribbed bar of the sieve-holder, there being movable catches whereby the sieve-frame is retained in position, substantially as described.

2. The combination of the sieve-holder having at one side a pair of bars forming a mortise, with a sieve-frame having a side bar forming a tenon for adaptation to said mortise, and an opposite side bar resting on a bar of the holder and secured thereto by movable catches, substantially as specified.

3. The combination of a sieve-holder, a sieve detachably mounted thereon, said holder having an end supporting-bar, a sieve-box also having a supporting-bar, one of said two sets of supporting-bars being grooved and the other set correspondingly tongued whereby the said holder is supported at one end, a supporting-bar for the other end of the sieve-holder and means for holding said end of the holder in detachable engagement with said supporting-bar, substantially as described.

4. The combination of the sieve-box of a gyrating sieve or bolting-machine, means for imparting gyrating movement thereto, supporting-rods for the box, sockets for said rods having threaded stems, a frame having feet provided with slotted openings constructed to receive said stems, and securing-nuts applied to the stems whereby they are retained in any desired position within said slots, substantially as described.

In testimony whereof I have signed my name to this specification in the presence of two subscribing witnesses.

AUGUSTUS WOLF.

Witnesses:
FRANK E. BECHTOLD,
JOS. H. KLEIN.